(12) United States Patent
Takeuchi et al.

(10) Patent No.: US 10,586,107 B2
(45) Date of Patent: Mar. 10, 2020

(54) INFORMATION PROCESSING SERVER, CLIENT, AND INFORMATION PROCESSING SYSTEM

(71) Applicant: HONDA MOTOR CO., LTD., Tokyo (JP)

(72) Inventors: Yuji Takeuchi, Tokyo (JP); Koji Sengoku, Tokyo (JP); Takamichi Shimada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 15/489,904

(22) Filed: Apr. 18, 2017

(65) Prior Publication Data
US 2017/0308752 A1 Oct. 26, 2017

(30) Foreign Application Priority Data

Apr. 26, 2016 (JP) .................................. 2016-088416

(51) Int. Cl.
*G06K 9/00* (2006.01)
*G06F 16/51* (2019.01)
(Continued)

(52) U.S. Cl.
CPC ......... *G06K 9/00684* (2013.01); *G06F 16/51* (2019.01); *G06F 16/58* (2019.01);
(Continued)

(58) Field of Classification Search
CPC ............. G06K 9/00684; G06K 9/3233; G06K 9/00677; G06K 9/00261; G06F 16/58;
(Continued)

(56) References Cited

U.S. PATENT DOCUMENTS

| 6,883,146 B2 * | 4/2005 | Prabhu | G06F 3/0481 |
| | | | 715/854 |
| 6,914,626 B2 * | 7/2005 | Squibbs | H04N 1/00127 |
| | | | 348/231.3 |

(Continued)

FOREIGN PATENT DOCUMENTS

| JP | 2011-118647 A | 6/2011 |
| JP | 2011-118648 A | 6/2011 |

(Continued)

OTHER PUBLICATIONS

Japanese Office Action corresponding to JP Application No. 2016-088416, dated Nov. 5, 2019.

*Primary Examiner* — Wesley J Tucker
(74) *Attorney, Agent, or Firm* — Squire Patton Boggs (US) LLP (57) ABSTRACT

Provided is an information processing server and the like, in which in response to the start of an "on" period of the movable body V, imaged images that are registered at the client 2 and a "designated location" are associated and transmitted to an information processing server 1. An image corresponding to a "first designated location" that is a designated location that is outside a "base area" that is specific to the client 2 is registered as a "first image" in the information processing server 1. Further, an "image library" with respect to a trip period of the client 2 is generated based on a plurality of first images that are registered in the information processing server 1 in response to the start of an "off" period of the movable body V that occurs one or a plurality of times.

3 Claims, 9 Drawing Sheets

(51) Int. Cl.
*G06F 16/583* (2019.01)
*G06F 16/58* (2019.01)
*G06K 9/32* (2006.01)
*H04W 4/029* (2018.01)
*H04N 1/00* (2006.01)
*H04L 29/06* (2006.01)

(52) U.S. Cl.
CPC ........ *G06F 16/583* (2019.01); *G06F 16/5866* (2019.01); *G06K 9/00671* (2013.01); *G06K 9/00677* (2013.01); *G06K 9/3233* (2013.01); *H04N 1/00244* (2013.01); *H04W 4/029* (2018.02); *G06K 9/00261* (2013.01); *H04L 67/42* (2013.01); *H04N 2201/3247* (2013.01); *H04N 2201/3253* (2013.01)

(58) Field of Classification Search
CPC .... G06F 16/5866; G06F 16/583; G06F 16/51; H04N 1/00244; H04N 2201/3253; H04N 2201/3247; H04W 4/029; H04L 67/42
See application file for complete search history.

(56) References Cited

U.S. PATENT DOCUMENTS

| | | | | |
|---|---|---|---|---|
| 7,020,848 | B2* | 3/2006 | Rosenzweig | G06F 16/58 |
| | | | | 715/855 |
| 7,110,592 | B2* | 9/2006 | Kotake | G01C 21/26 |
| | | | | 382/154 |
| 7,856,311 | B2* | 12/2010 | Matsuura | G01C 21/3679 |
| | | | | 701/424 |
| 2017/0115128 | A1* | 4/2017 | Sengoku | G01C 21/3617 |
| 2018/0202826 | A1* | 7/2018 | Takeuchi | G01C 21/3469 |
| 2018/0232369 | A1* | 8/2018 | Takeuchi | G06F 16/54 |

FOREIGN PATENT DOCUMENTS

| | | |
|---|---|---|
| JP | 2011-118649 A | 6/2011 |
| JP | 2014-089605 A | 5/2014 |

\* cited by examiner

INFORMATION PROCESSING SERVER, CLIENT, AND INFORMATION PROCESSING SYSTEM

BACKGROUND OF THE INVENTION

Field of the Invention

The present invention relates to technology for processing information collected from clients as each of a plurality of mobile stations.

Description of the Related Art

Information processing technology has been proposed that separates stopping sections and movement sections on a time axis based on the location history of a vehicle, selects photographs after determining a number of photographs to be displayed for each section, and arranges a plurality of the selected photographs in chronological order to thereby create and display a slide show (see Japanese Patent Laid-Open No. 2011-118647, Japanese Patent Laid-Open No. 2011-118648, and Japanese Patent Laid-Open No. 2011-118649). The photographs are separated into, for example, portrait photographs (photographs in which a face was detected) and non-portrait photographs, and the number of photographs for each section is adjusted.

However, there are quite a few cases in which many photos that are not in accordance with the preference of the user are unexpectedly included in the photos contained in the slide show.

Therefore, a technical problem to be solved by the present invention is to provide an information processing server and the like that are capable of generating information in a more meaningful form for a user based on a plurality of images that are imaged at a client.

SUMMARY OF THE INVENTION

An information processing server according to the present invention comprises: a server storage device; a first server arithmetic processing element configured to receive an image that is imaged at a client which is mounted in a movable body and is stored in response to a start of an "off" period of the movable body that is immediately before an "on" period of the movable body and that is transmitted from the client in response to a start of the "on" period, and a designated location as a location of the imaging or a location where the client is present at an ending time point of a previous "on" period of the movable body or at a starting time point of a current "on" period, and to cause the image that corresponds to a first designated location that is outside a base area that is specific to the client among the designated locations to be stored and held as a first image in the server storage device; and a second server arithmetic processing element configured to generate an image library with respect to a trip period of the client based on a plurality of the first images that are stored and held in the server storage device in response to a start of an "off" period of the movable body that occurs one or a plurality of times during the trip period.

A client according to the present invention is mounted in a movable body, and comprises an imaging device, a client storage device configured to associate an image that is imaged by the imaging device with a location where the image is imaged and to store and hold the associated image and the location where the image is imaged, an input device and an output device, and has a function that communicates with an information processing server, the client further comprising: a first client arithmetic processing element configured to register an image that is imaged by the imaging device in the client storage device in response to a start of an "off" period of the movable body, and in response to a start of an "on" period of the movable body that follows registration of the image, to associate and transmit the image and a designated location as a location where the image is imaged or a location where the client is present at an ending time point of a previous "on" period or a starting time point of a current "on" period of the movable body to the information processing server, and to cause the image that corresponds to a first designated location that is outside a base area that is specific to the client among the designated locations to be registered as a first image in the information processing server; and a second client arithmetic processing element configured to cause an image library relating to a movement route of the client with respect to a trip period of the client that is generated based on a plurality of the first images that are registered in the information processing server in response to a start of an "off" period of the movable body that occurs one or a plurality of times during the trip period to be output by the output device after being recognized by means of communication with the information processing server.

According to the information processing server and the client as well as an information processing system constituted by the information processing server and the client of the present invention, an image that is imaged at the client is registered by the client in response to the start of an "off" period of a movable body (switching of the movable body from "on"→"off") in which the relevant client is mounted. Thereafter, in response to the start of an "on" period of the movable body (switching of the movable body from "off"→"on"), the imaged image that was registered and a "designated location" are associated and transmitted to the information processing server. The "designated location" is an imaging location of the respective images or a location where the client is present at an ending time point of the previous "on" period or a starting time point of the current "on" period of the movable body. That is, the "designated location" is a location with respect to which the probability that the user of the client or movable body stopped off at or visited that location is high. An image corresponding to a "first designated location" that is a designated location that is outside a "base area" that is specific to the client is registered as a "first image" in the information processing server.

Further, an "image library" with respect to a trip period of the client is generated based on a plurality of first images that are registered in the information processing server in response to the start of "off" periods of the movable body that occurs one or a plurality of times during the trip period. The image library is output through the client. The image library may also be generated in association with a "movement route" that is determined based on a chronological order of positions of the client during the trip period from a time when a destination location is set until the client arrives at the destination location. A configuration may also be adopted in which a combination of a "second designated location" and a "second image" is designated at the client, and an image library is generated based on second images corresponding to second designated locations that are included in an area within a reference distance from the first designated location with respect to the client.

By designating an area which includes a location which the user stops off at on a daily basis or frequently as a base area, an image library is generated based on images (first images) that are imaged by the client at a stopping location (first designated location) or a stopping area at which the user stopped on a non-daily or occasional basis. By this means, in a situation such as when reminding a user of a history of locations at which the user stopped on a non-daily or occasional basis, the usefulness of the image library for the user can be improved.

DETAILED DESCRIPTION OF THE PREFERRED EMBODIMENTS (Configuration)

Figure 1:
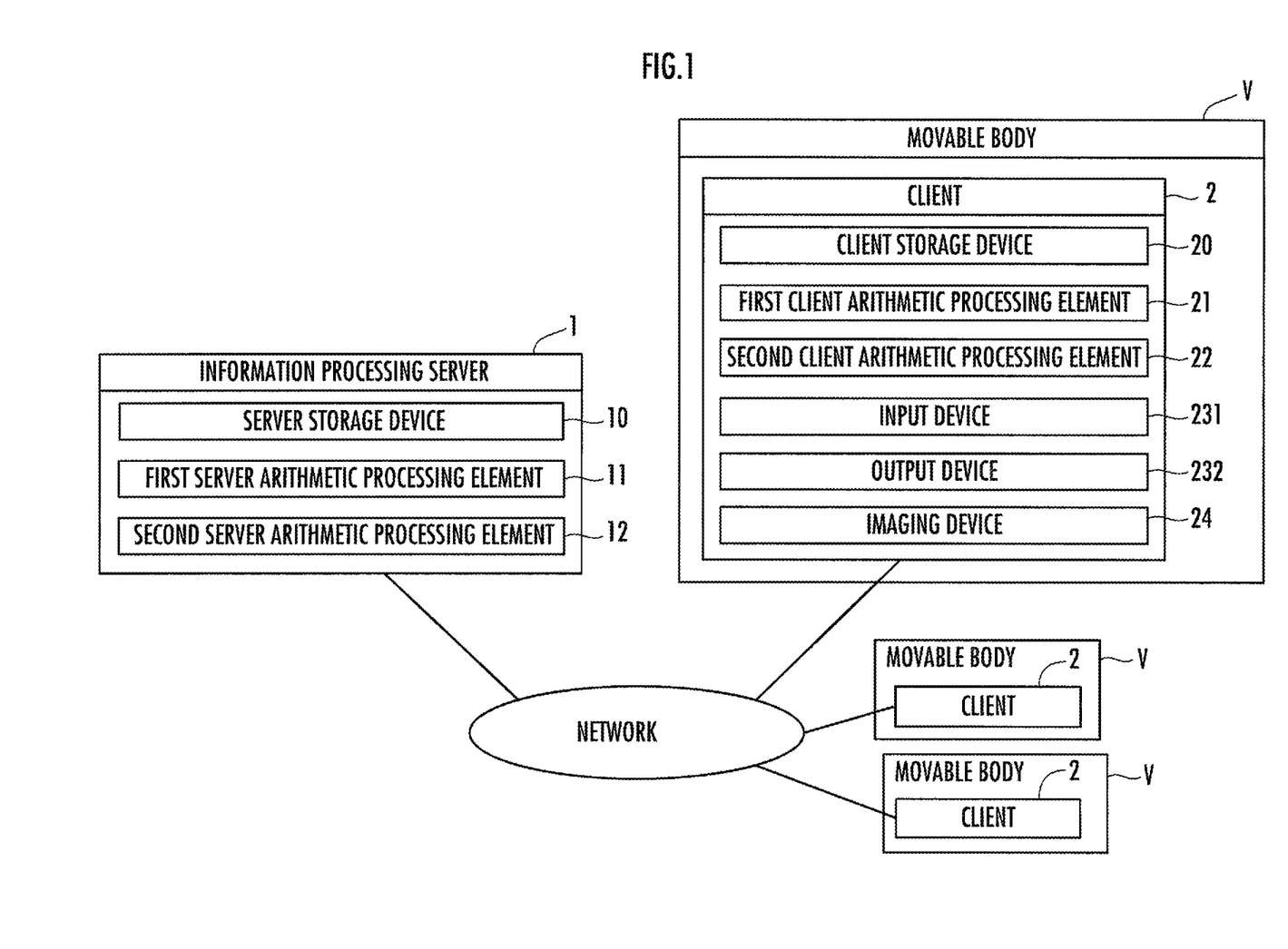
FIG. 1 is an explanatory drawing illustrating the configuration of an information processing server as one embodiment of the present invention.

An information processing system as one embodiment of the present invention that is illustrated in FIG. 1 is constituted by an information processing server 1 and a plurality of clients 2. The information processing server 1 and the plurality of clients 2 are each capable of performing intercommunication through one or a plurality of networks. The client 2 is configured to be mounted in a movable body V that is an apparatus having a function of moving in accordance with a driving operation of a user, such as a vehicle that is a four-wheeled vehicle, a motorcycle, a bicycle or the like. The term "mount" is a concept that also includes a case of being carried by a user that drives the movable body V.

(Configuration of Information Processing Server)

The information processing server 1 comprises a server storage device 10, a first server arithmetic processing element 11 and a second server arithmetic processing element 12. The information processing server 1 may also be constituted by a portable terminal device such as a smartphone or a tablet.

The server storage device 10 is configured to store and hold received information and arithmetic processing results from each of the first server arithmetic processing element 11 and the second server arithmetic processing element 12. In addition, the server storage device 10 is configured to store and hold road traffic information and server map information. The "road traffic information" includes a travelling cost for respective links and the like. The "server map information" includes, in addition to a position, a shape, an orientation or the like of each link constituting a road, which are represented with columns of coordinate values ((latitude, longitude) or (latitude, longitude, altitude)), link identification information for identifying each link and data representing attributes of the links and the like. The respective links are connected by nodes.

The first server arithmetic processing element 11 and the second server arithmetic processing element 12 each include an arithmetic processing unit (CPU) that reads software and data from a designated area of a memory constituting the server storage device 10 as needed, and then executes designated arithmetic processing that takes the data as an object in accordance with the software, and also include, as needed, a communication device and a storage device (memory) and the like. The details of the designated arithmetic processing are described later.

(Configuration of Client)

The client 2 is constituted by a portable terminal device such as a smartphone or tablet. The term "portable" refers to, for example, a terminal having a size that is approximately the standard palm size of a human, and a weight that can be easily carried around with one hand or in a pocket of an article of clothing. The client 2 may also be constituted by a device that has a size and a weight that are greater than those of a portable device (for example, a device that is incorporated into a movable body).

The client 2 comprises a client storage device 20, a first client arithmetic processing element 21, a second client arithmetic processing element 22, an input device 231, an output device 232, and an imaging device 24.

The client storage device 20 is configured to store and hold received information and arithmetic processing results such as calculation results from each of the first server arithmetic processing element 21 and the second server arithmetic processing element 22. The client storage device 20 is configured to store client map information. The "client map information" contains coordinate columns representing a position, a shape, an orientation and the like of each link constituting a road, and link identification information for identifying each link.

The first client arithmetic processing element 21 and the second client arithmetic processing element 22 each include an arithmetic processing unit (CPU) that reads software and data from a designated area of a memory constituting the client storage device 20 as needed, and then executes designated arithmetic processing that takes the data as an object in accordance with the software, and also include, as needed, a communication device and a storage device (memory) and the like. The details of the designated arithmetic processing are described later.

The input device 231 is constituted by operation buttons or a microphone, and enables various operations and the input of settings by a user operation or by an utterance of a user. The imaging device 24 is operated through the input device 231. The output device 232 is constituted by a display device and an acoustic output device (speaker), and displays image contents such as client map information or outputs acoustic contents. The input device 231 and the output device 232 may be constituted by a touch-panel type display.

As used herein, the term "output" of information by a constituent element of the present invention refers to outputting information in any form which allows a human to recognize the information through the five senses of the human body, such as the sense of sight, the sense of hearing and the sense of touch, by displaying the information, audio output of the information or vibrational output of the information or the like. Further, as used herein, a constituent element of the present invention being "configured" to execute arithmetic processing that is assigned to the constituent element means that the constituent element in question has a function to read a necessary program and data from a memory or the like, and to then execute the assigned arithmetic processing in accordance with the relevant program based on the relevant data, and by extension means "programmed".

(Functions)

Functions of the information processing system having the above configuration will now be described.

Figure 2:
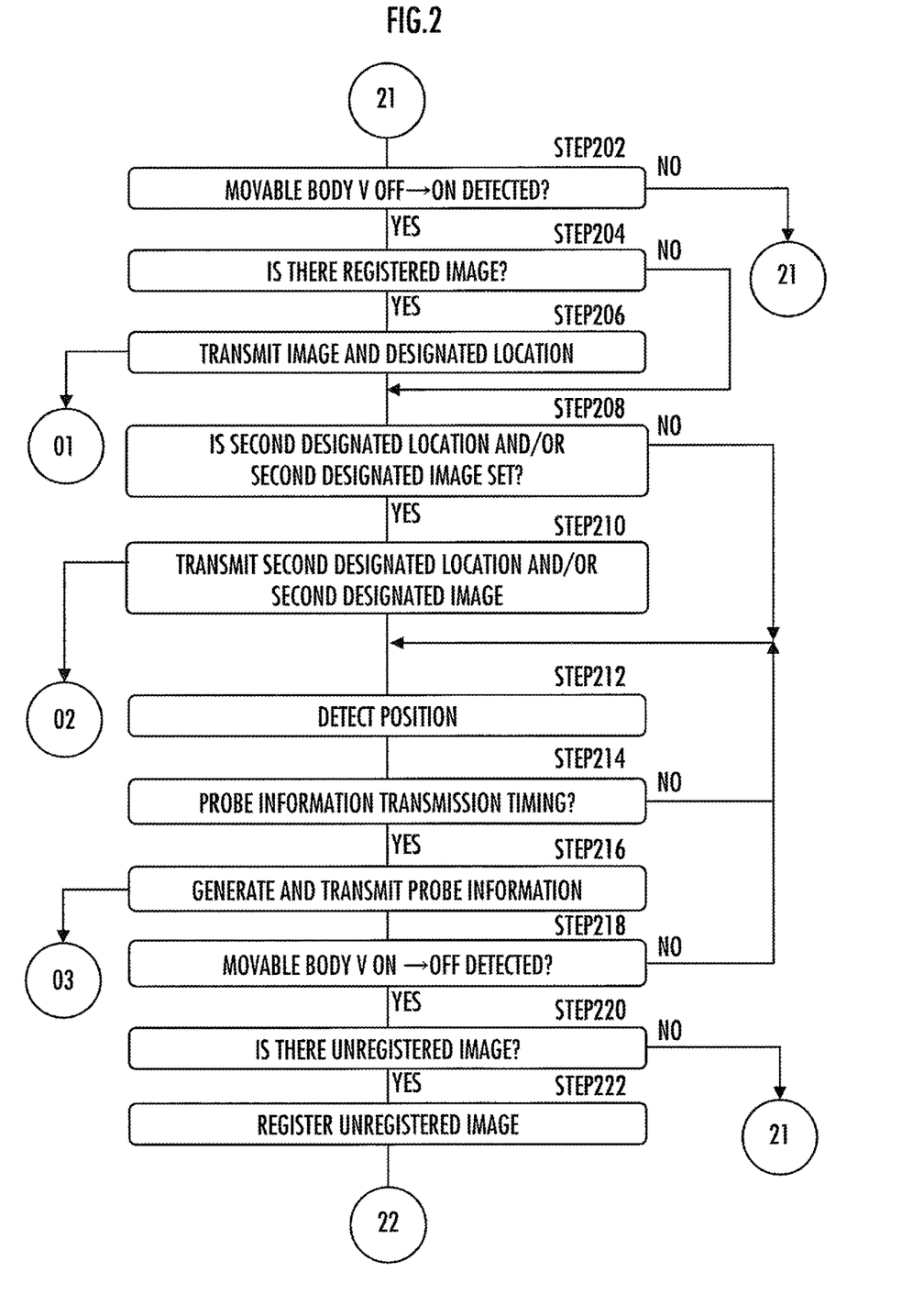
FIG. 2 is an explanatory drawing relating to functions of a client.

The first client arithmetic processing element 21 in the client 2 determines whether or not the movable body V in which the client 2 is mounted was switched from "off" to "on" (whether or not a current "on" period started) (FIG. 2/step 202). The first client arithmetic processing element 21 detects whether the movable body V is "on" or "off" based on communication with a device mounted in the movable body V (for example, based on whether an IGN switch is "on" or "off").

If it is determined that the movable body V was switched from "off" to "on" ("YES" in FIG. 2/step 202), the first client arithmetic processing element 21 determines whether or not an image is registered in the client storage device 20 (FIG. 2/step 204). The image (a still image, a moving image or a combination of a still image and a moving image) is an image that is imaged by the imaging device 240 and is registered as an object to be transmitted to the information processing server 1 in response to the start of the next "on" period as described later.

If it is determined that there is an image registered in the client storage device 20 ("YES" in FIG. 2/step 204), the first client arithmetic processing element 21 transmits the relevant image to the information processing server 1 together with a designated location (FIG. 2/step 206). The term "designated location" refers to a location where the client 2 is present at the ending time point of the previous "on" period or the starting time point of the current "on" period, or to the imaging location of each image (location where the client 2 is present at a time point of imaging the respective images by the imaging device 24), and is detected by the first client arithmetic processing element 21. If it is determined that there is no image registered in the client storage device 20 ("NO" in FIG. 2/step 204), the processing transitions in that state to the next procedure.

The first client arithmetic processing element 21 determines whether or not at least one of a second image and a second designated location is designated (FIG. 2/step 208). For example, from among designated locations and images corresponding to the designated locations that are registered or stored and held in the client storage device 20 or the server storage device 10, an arbitrary image is directly designated as a second image through the input device 231, and a designated location corresponding to the relevant second image is indirectly designated as a second designated location. A configuration may also be adopted in which an arbitrary designated location is directly designated as a second designated location, and an image corresponding to the relevant designated location is indirectly designated as a second image. A second image and a second designated location may also be directly designated, respectively, through the input device 231. Apart from an image showing scenery of the second designated location, the second image may also be an image that is unrelated to the scenery in question.

If it is determined that at least one among a second image and a second designated location is designated ("YES" in FIG. 2/step 208), the first client arithmetic processing element 21 transmits the designated item or items to the information processing server 1 (FIG. 2/step 210). If it is determined that neither of a second image and a second designated location is designated ("NO" in FIG. 2/step 208), the processing transitions in that state to the next procedure.

The first client arithmetic processing element 21 successively detects the position of the movable body V (FIG. 2/step 212). The current position of the client 2 is measured based on a signal received from a man-made satellite by a GPS receiver or, as necessary, is measured based on an output signal from a gyro sensor.

The first client arithmetic processing element 21 determines whether or not the current timing is a timing for transmitting probe information (FIG. 2/step 214). For example, the first client arithmetic processing element 21 determines whether or not a condition such as a specified time period elapsing from the previous time that probe information was transmitted, or a travelling distance of the movable body since the previous time that probe information was transmitted reaching a specified distance, or the amount of probe information reaching a predetermined amount, has been satisfied.

If the first client arithmetic processing element 21 determines that the current timing is a timing for transmitting probe information ("YES" in FIG. 2/step 214), the first client arithmetic processing element 21 generates probe information which represents the chronological order of the positions of the movable body V, and transmits the probe information to the information processing server 1 (FIG. 2/step 216). The probe information includes identification information for identifying the client 2 or the movable body V, or the user of the client 2 or the movable body V. If the first client arithmetic processing element 21 determines that the current timing is not a timing for transmitting probe information ("NO" in FIG. 2/step 214), detection of the position of the movable body V is continued (FIG. 2/step 212).

The first client arithmetic processing element 21 determines whether or not the movable body V was switched from "on" to "off" (whether or not the current "on" period ended) (FIG. 2/step 218).

If it is determined that the movable body V was not switched from "on" to "off" ("NO" in FIG. 2/step 218), detection of the position of the movable body V is continued (FIG. 2/step 212). If it is determined that the movable body V was switched from "on" to "off" ("YES" in FIG. 2/step 218), from among images which were imaged by the imaging device 24 and which were stored and held in the client storage device 20, the first client arithmetic processing element 21 determines the existence or non-existence of an unregistered image as an image that is an object for transmission to the information processing server 1 in response to the start of the next "on" period (FIG. 2/step 220).

If it is determined that an unregistered image exists ("YES" in FIG. 2/step 220), the first client arithmetic processing element 21 registers the unregistered image in question in the client storage device 20 (FIG. 2/step 222). If it is determined that no unregistered image exists ("NO" in FIG. 2/step 220), it is determined whether or not the movable body V was switched from "off" to "on" (FIG. 2/step 202).

Figure 3:
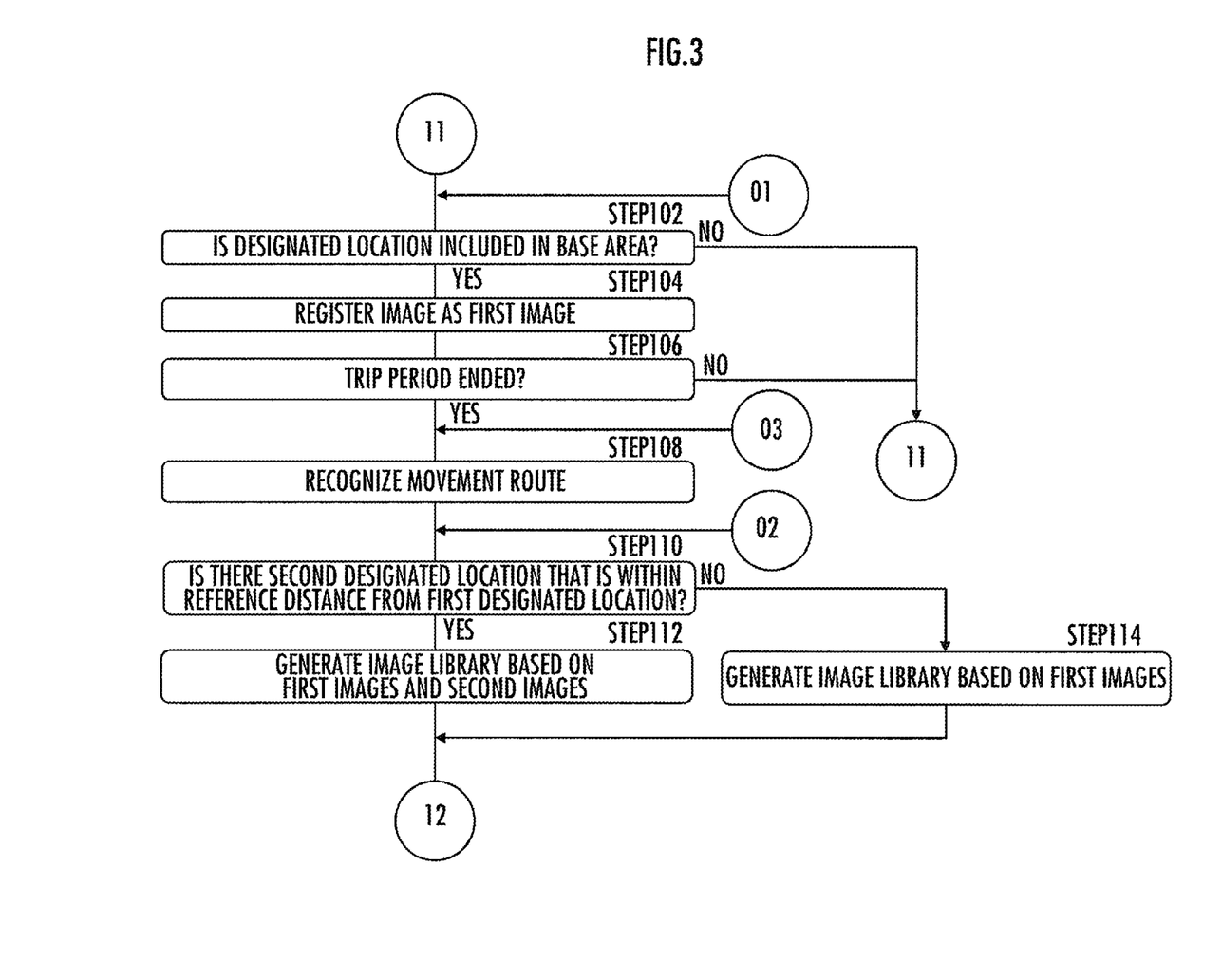
FIG. 3 is an explanatory drawing relating to functions of the information processing server.

At the information processing server 1, upon receiving the image and the designated location from the client 2, the first server arithmetic processing element 11 stores and holds the image and the designated location in the server storage device 10, and determines whether or not the designated location is included in a "base area" (FIG. 3/step 102).

The base area will now be described using FIG. 5. In the example illustrated in FIG. 5, locations Q0, Q1 and Q2 are each a stopping base which the user of the client 2 or the movable body V that is identified by the identification information stops at on a daily basis, and the user travels back and forth between the stopping bases Q0 and Q1 by passing along a route R1, and also travels back and forth between the stopping bases Q1 and Q2 by passing along a route R2. The first server arithmetic processing element 11 adds up the frequency at which the movable body V is present at the respective locations based on probe information that is transmitted thereto from the client 2 of the relevant user. The frequency at which the movable body V is present at the respective locations at a time point at which the movable body V switches between an "on" state and an "off" state is evaluated as a "stopping frequency", and the frequency at which the movable body V is present at the respective locations at a time point at which an "on" state of the movable body V is continuing is evaluated as a "passing frequency". As a result, the stopping frequency for each of the locations Q0, Q1 and Q2 and the passing frequency for each of a plurality of locations on the respective routes R1 and R2 are each evaluated as high values.

The first server arithmetic processing element 11 designates an area including a location for which the stopping frequency of the movable body V is equal to or greater than a first threshold value as a first base area, and designates an area including a location for which the passing frequency of the movable body V is equal to or greater than a second threshold value as a second base area. The first threshold value may be set to a lower value than the second threshold value.

Figure 5:
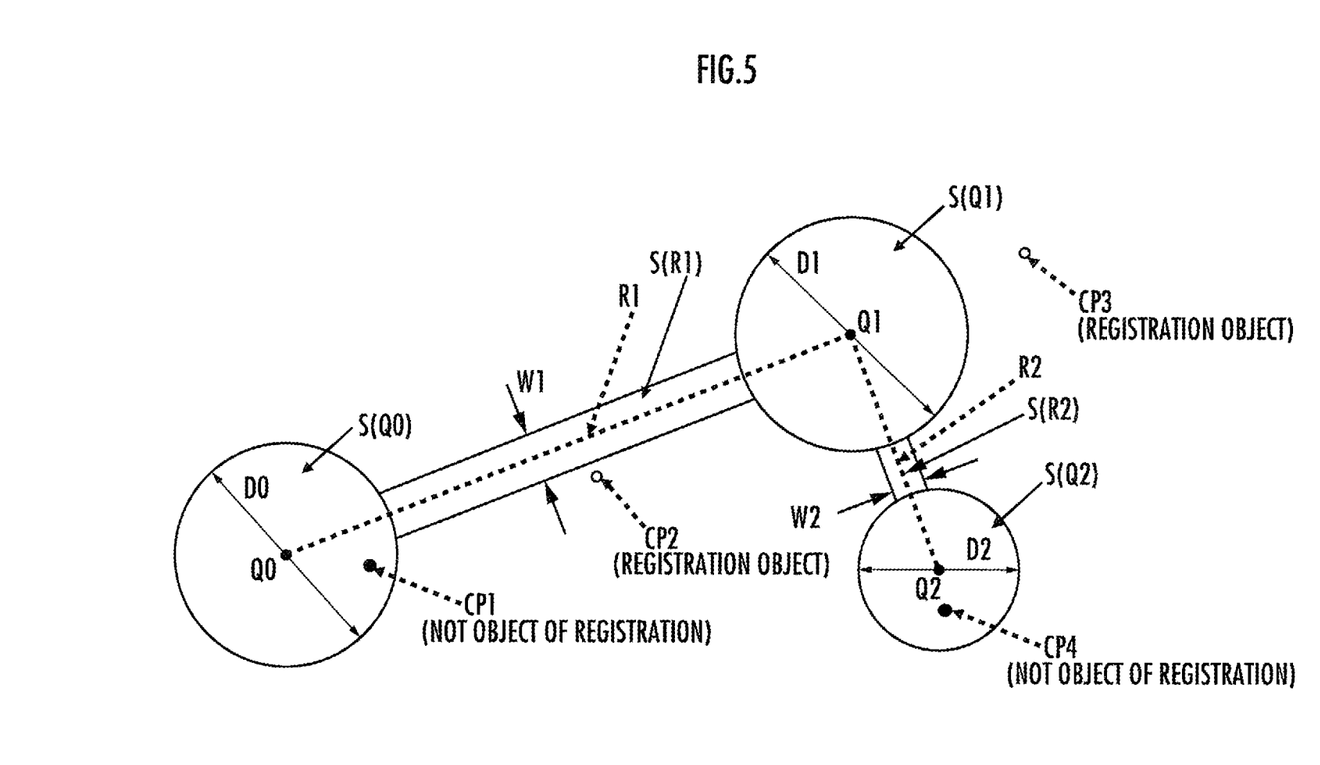
FIG. 5 is an explanatory drawing relating to a base area.

According to the example illustrated in FIG. 5, band-shaped areas in which circular areas which extend in a manner in which the circular areas are centered on each of a plurality of locations on the routes R1 and R2, respectively, are gathered together are designated as first base areas S(R1) and S(R2), respectively. Further, circular areas which extend in a manner in which the circular areas are centered on each of the stopping bases Q0, Q1 and Q2 are designated as second base areas S(Q0), S(Q1) and S(Q2), respectively. The two ends of the first base area S(R1) overlap with the second base areas S(Q0) and S(Q1), respectively. The two ends of the first base area S(R2) overlap with the second base areas S(Q1) and S(Q2), respectively.

A magnitude relation between respective widths W1 and W2 of the first base areas S(R1) and S(R2) is W1>W2. The magnitudes of the aforementioned widths are defined according to the level of the passing frequency of the movable body V in which the client 2 is mounted. Note that the shape of the areas including respective passing locations constituting the first base areas may be, in addition to a circular shape that is centered on the relevant passing location, an elliptical shape, a triangular shape or a polygonal shape such as a quadrangular (rectangular, trapezoidal and the like) shape. The sizes (diameters in a case where the areas including the respective passing location are circular) of the areas constituting the first base areas may all be the same.

A magnitude relation between respective diameters D0, D1 and D2 of the second base areas S(Q0), S(Q1) and S(Q2) is D1>D0>D2. The magnitudes of the aforementioned diameters are defined according to the level of the stopping frequency of the movable body V in which the client 2 is mounted. Note that the shape of the second base areas, may be, in addition to a circular shape that is centered on a base, an elliptical shape, a triangular shape or a polygonal shape such as a quadrangular (rectangular, trapezoidal and the like) shape. The sizes (diameters in a case where the second base areas are circular) of the second base areas may all be the same. The widths of all of the first base areas may be set to be smaller than the diameters of all of the second base area (in terms of this example, D2 may be greater than W1).

A configuration may be adopted in which a base area is received or recognized by the first server arithmetic processing element 11 by transmitting the base area to the information processing server 1 after being designated by the first client arithmetic processing element 21 or the second client arithmetic processing element 22 of the client 2, instead of the first server arithmetic processing element 11 of the information processing server 1. A base area may also be set in accordance with the intention of the user through the input device 231 of the client 2.

In a case where respective locations CP1, CP2, CP3 and CP4 illustrated in FIG. 5 are extracted as first designated locations, it is determined that the locations CP2 and CP3 are not included in any of the base areas. In contrast, it is determined that the locations CP1 and CP4 are included in one base area, respectively.

If it is determined that the designated location is included in the base area ("YES" in FIG. 3/step 102), the first server arithmetic processing element 11 stores and holds an image corresponding to the relevant designated location in the server storage device 10 as a "first image" corresponding to a "first designated location" (FIG. 3/step 104). If it is determined that the designated location is not included in the base area ("NO" in FIG. 3/step 102), thereafter it is determined whether or not a newly received designated location is included in the base area (FIG. 3/step 102).

The second server arithmetic processing element 12 determines whether or not the trip period of the client 2 ended (FIG. 3/step 106).

For example, in a case where a destination location is set through the input device 231 at the client 2, the second server arithmetic processing element 12 receives the destination location from the client 2, and determines whether or not the trip period ended in response to whether or not the designated location that was last received (see FIG. 2/step 206) is included in a neighboring area that is within a predetermined distance from the relevant destination location. In this case, the time point at which the destination location is set or the time point at which the destination location is received is presumed to be the starting time point of the trip period. Note that, a server route R (1) may also be calculated as described later in response to reception of the destination location.

If a destination location is not set at the client 2, the second server arithmetic processing element 12 determines whether or not the trip period has ended in accordance with whether or not the second server arithmetic processing element 12 received a current designated location from the client 2 (see FIG. 2/step 206). In this case, the time of receiving the previous designated location is presumed to be the starting time point of the trip period.

If it is determined that the trip period of the client 2 has not ended ("NO" in FIG. 3/step 106), the processing from FIG. 3/step 102 onward is repeated. On the other hand, if it is determined that the trip period of the client 2 ended ("YES" in FIG. 3/step 106), the second server arithmetic processing element 12 searches for or calculates a movement route R of the client 2 during the relevant trip period (FIG. 3/step 108). For example, the movement route R is calculated based on one or both of probe information (see FIG. 2/step 216) and a designated location (see FIG. 2/step 206) or a first designated location that accompanies an image that is transmitted from the client 2 one or plurality of times during the trip period (see FIG. 6A and FIG. 6B).

The second server arithmetic processing element 12 determines the existence or non-existence of registration of a second designated location Qk that is included in a range within a reference distance Di from a first designated location Pi that is included in the movement route R (FIG. 3/step 110). The second designated location Qk and a second image Elk corresponding thereto are received from the client 2 by the first server arithmetic processing element 11 and are registered in the server storage device 10. For example, in a case where the second designated location Qk is within the reference distance Di from the first designated location Pi illustrated in FIG. 7, the result of the determination is affirmative.

If it is determined that a second designated location which is included within a range inside a reference distance from a first designated location is registered ("YES" in FIG. 3/step 110), the second server arithmetic processing element 12 generates an image library that is associated with the movement route R by editing the second images corresponding to the second designated locations, in addition to the first images corresponding to the first designated locations (FIG. 3/step 112). On the other hand, if it is determined that a second designated location which is included within a range inside a reference distance from a first designated location is not registered ("NO" in FIG. 3/step 110), the second server arithmetic processing element 12 generates an image library that is associated with the movement route R by editing the first images corresponding to the first designated locations (FIG. 3/step 114).

Figure 4:
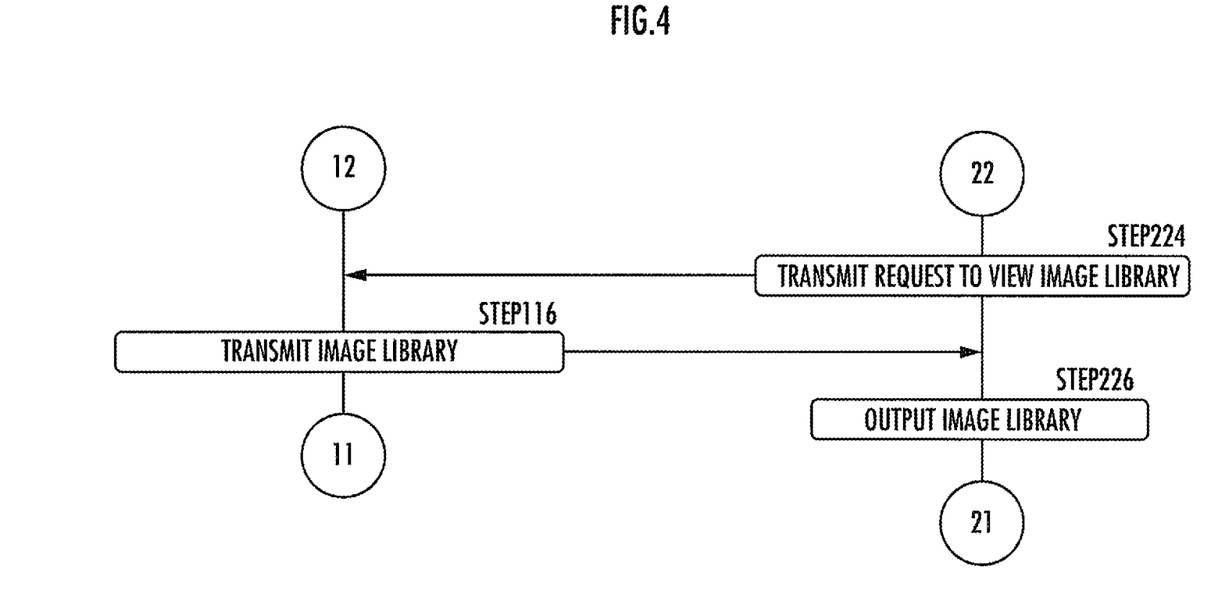
FIG. 4 is an explanatory drawing relating to functions of an information processing system.

Thereafter, the second client arithmetic processing element 22 in the client 2 receives information to the effect that a request to view the image library was made through the input device 231, and transmits the request to the information processing server 1 (FIG. 4/step 224). Identification information that identifies the client 2 or the user thereof, and one or a plurality of locations or time points that are registered in the server storage device 10 in association with the identification information, or information designating a trip are included in the request.

In response thereto, the second server arithmetic processing element 12 in the information processing server 1 transmits an image library in accordance with the request to the client 2 (FIG. 4/step 116). Subsequently, the second client arithmetic processing element 22 in the client 2 causes the output device 232 to output the image library (FIG. 4/step 226).

Figure 6A:
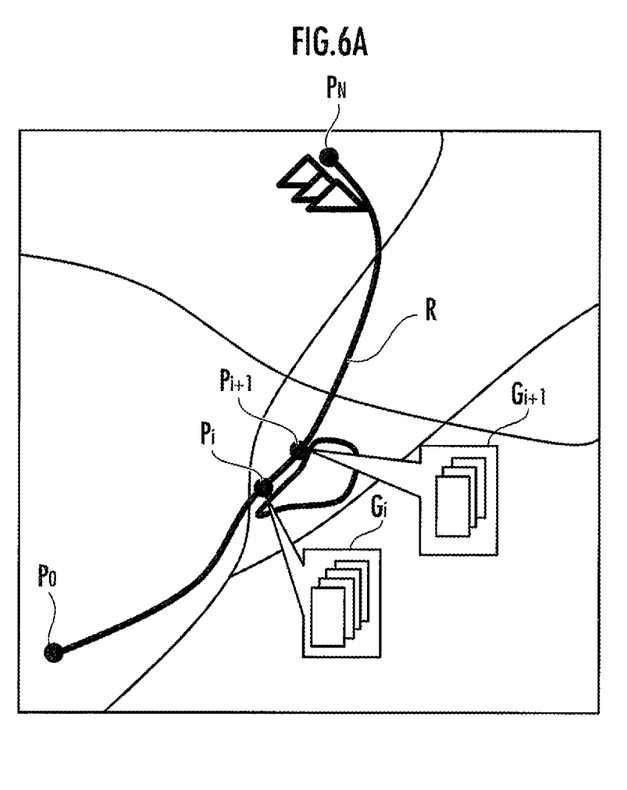
FIG. 6A is an explanatory drawing relating to one output form of an image library.
Figure 6B:
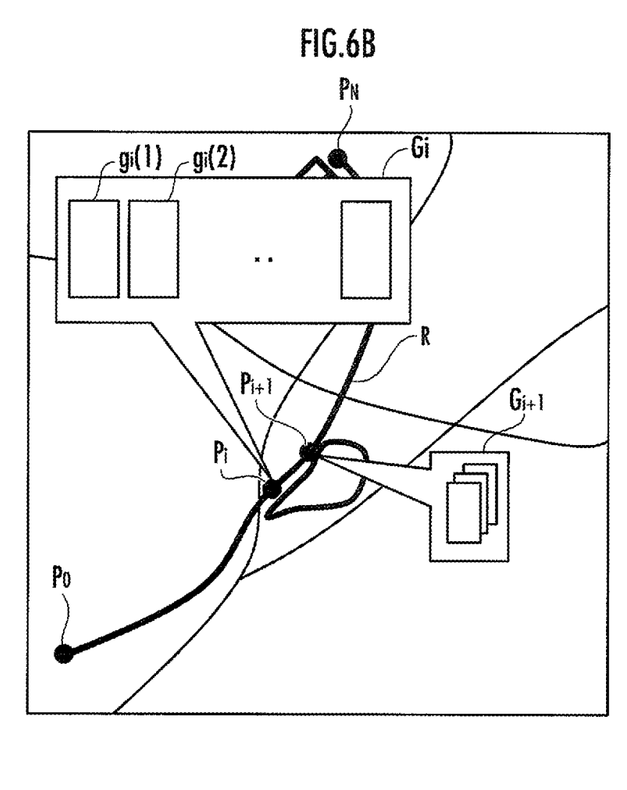
FIG. 6B is an explanatory drawing relating to an expanded form of the one output form of the image library.

By this means, in a case where the designated location is a location at which the client 2 is present at the starting time point of an "on" period of the movable body V, for example, as illustrated in FIG. 6A, the movement route R and first designated locations Pi (i=1, 2, . . . N) on the movement route R as well as first image groups Gi that correspond to the respective first designated locations Pi are displayed on a navigation map on the output device 232. A configuration may also be adopted in which the first image group Gi is displayed by a specified operation such as a tap operation or a flick operation at a position corresponding to the first designated location Pi. In addition, a configuration may be adopted in which, for example, as illustrated in FIG. 6B, a plurality of first images gi(1), gi(2), . . . constituting the first image group Gi are displayed in an enlarged form by a specified operation such as a tap operation or a flick operation at a position corresponding to the first image group Gi in question.

Figure 7:
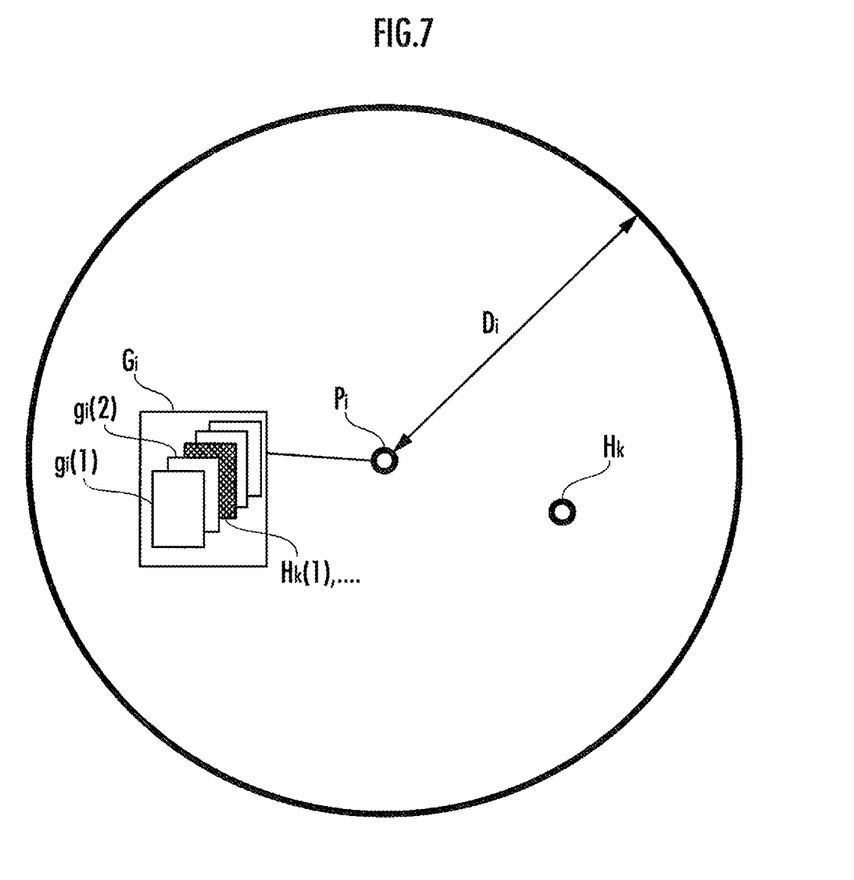
FIG. 7 is an explanatory drawing relating to an output form of an image library including a second image.

For example, as illustrated in FIG. 7, in a case where a second designated location Hk exists that is within the reference distance Di from the first designated location Pi, the first image group Gi is also constituted by a second image Hk(1), . . . that corresponds to the second designated location Elk, in addition to the first images gi(1), gi(2), . . . .

Figure 8:
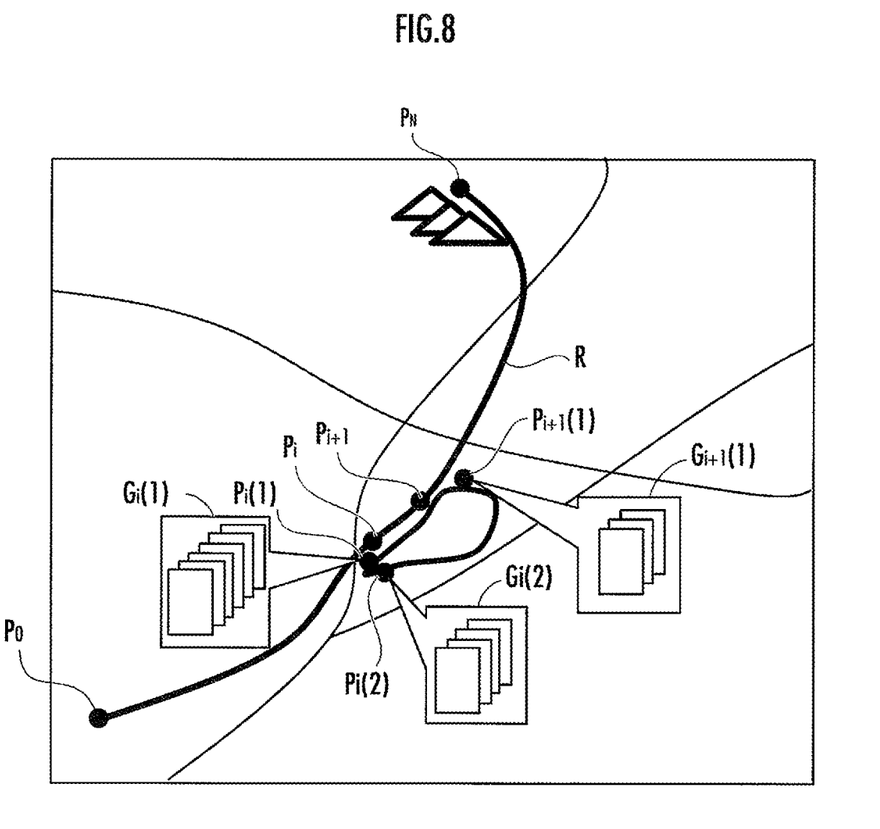
FIG. 8 is an explanatory drawing relating to another output form of an image library.

Note that, in a case where a designated location is an imaging location of respective images, for example, as illustrated in FIG. 8, in addition to peripheral locations Pi(1), Pi(2), . . . around the location Pi where the client 2 is present at the starting time point of the "on" period, first image groups Gi(1), Gi(2), . . . including first images that were imaged at the corresponding locations are displayed on the output device 232.

Figure 9:
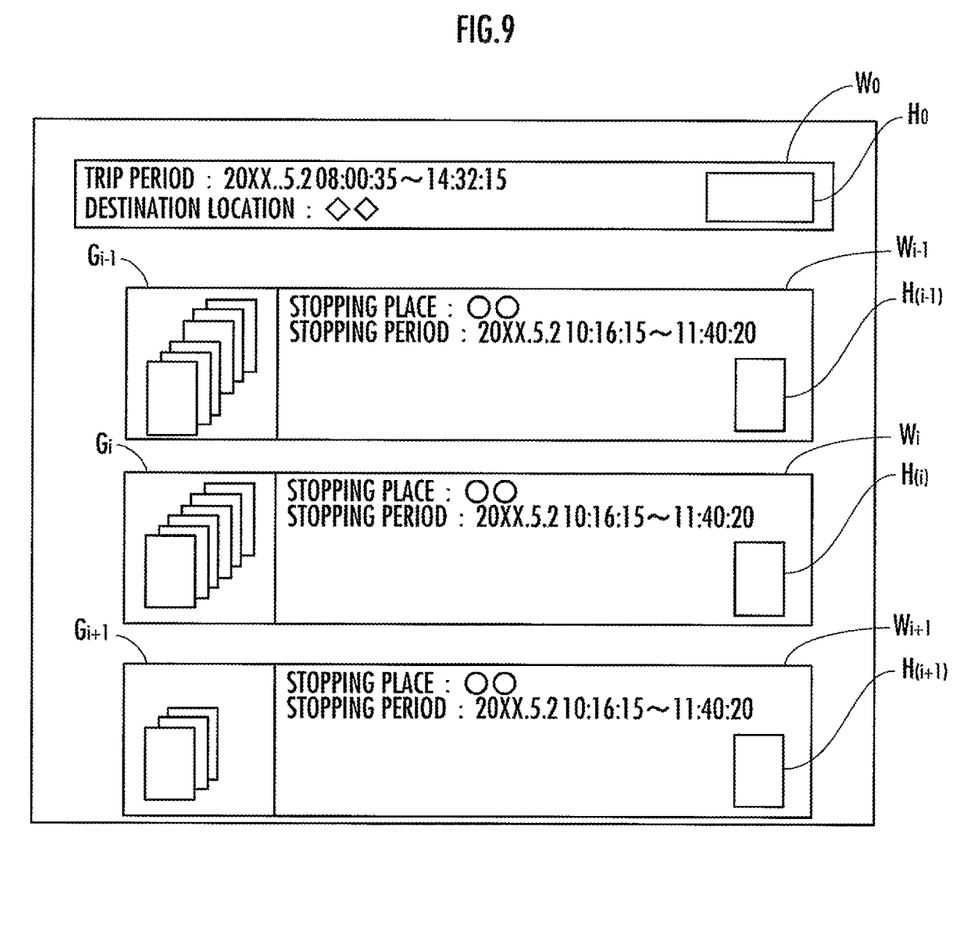
FIG. 9 is an explanatory drawing relating to a different output form of an image library.

Furthermore, for example, as illustrated in FIG. 9, a configuration may be adopted in which an image library that is associated with respective trip periods or movement routes is displayed on the output device 232 in a form in which a plurality of windows W0 and Wi−1, Wi, Wi+1, . . . are included. In the window W0, a representative image H0 of the relevant trip (the representative image H0 may be designated by the user) is displayed in addition to a summary of the trip (trip period, destination location (trip sections), traveling companions and the like). In the window Wi, as well as the first image group Gi and a first designated location Pi corresponding thereto or a stopping form at the first designated location Pi (the name of the first designated location Pi or of an establishment at the first designated location Pi, the latitude and longitude, and stopping period and the like), a representative image H(i) (for example, a second designated image or an image that is designated by the user) of the first designated location Pi is displayed.

(Working Effects)

According to the information processing server 1 and the client 2 as well as the information processing system that is constituted by the information processing server 1 and the client 2, an image that is imaged at the client 2 is registered in the client 2 is response to the start of an "off" period of the movable body V in which the client 2 is mounted (see FIG. 2/step 218→step 220→step 222). Thereafter, in response to the start of an "on" period of the movable body V, imaged images that are registered and "designated locations" are associated with each other and transmitted to the information processing server 1 (see FIG. 2/step 202→step 204→step 206). The "designated location" is the imaging location of the respective images or the location at which the client 2 is present at an ending time point of the previous "on" period of the movable body V or at the starting time point of the current "on" period. That is, the "designated location" is a location with respect to which there is a high probability that the user of the client 2 or the movable body V stopped off at that location. An image corresponding to a "first designated location" that is a designated location that is outside a "base area" that is specific to the client 2 is registered in the information processing server 1 as a "first image" (see FIG. 3/step 102→step 104).

Further, an "image library" for a trip period of the client 2 is generated based on a plurality of first images registered in the information processing server 1 in response to the start of an "off" period of the movable body V one or a plurality of times during the relevant trip period (see FIG. 3/step 112 and step 114). The image library is output through the client (see FIG. 4/step 226, FIG. 8 and FIG. 9). The image library is generated in association with a movement route R that is defined based on the chronological order of positions of the client 2 during a trip period from a time when a destination location is set until a time at which the client 2 arrives at the destination location (see FIG. 6A and FIG. 6B). A combination of a "second designated location" and a "second image" are designated at the client 2, and an image library is generated based on a second image Hk that corresponds to a second designated location Qk that is included in a range within a reference distance from a first designated location Pi with respect to the client 2 (see FIG. 7).

Areas which include locations which the user stops off at on a daily basis or frequently are designated as base areas. Specifically, based on probe information of the movable body V, a first base area that includes a location with respect to which a passing frequency of the movable body V is equal to or greater than a first threshold value, and a second base area that includes a location with respect to which a stopping frequency of the movable body V is equal to or greater than a second threshold value are set as base areas (see S(Q0), S(Q1), S(Q2), S(R1) and S(R2) in FIG. 5). By this means, a position of a location which the user stops off at on a non-daily or occasional basis is registered as a designated location (see FIG. 5/CP2 and CP3).

The first base area is set to a narrower area than the second base area. For example, a width Wi of a first base area S(Ri) (i=1, 2) in FIG. 5 is set narrower than a diameter Dj of a second base area S(Qj) (j=0, 1, 2). By this means, a narrow base area is actualised in a case where the passing frequency of the user at a certain location is higher in comparison to a case where the stopping frequency of the user at the certain location is higher. Therefore, in a case where a user occasionally stops off at a location that is separated by only a short distance (see FIG. 5/CP2) from a location which is merely a location that the user passes on a daily basis, the possibility of the position of the location which the user occasionally stops off at being excluded from designated locations can be decreased.

As a result of the foregoing operations, an image library is generated based on images (first images) that are imaged by the client 2 at a stopping location (first designated location) or a stopping area at which the user stopped on a non-daily or occasional basis (see FIG. 6A, FIG. 6B and FIG. 7 to FIG. 9). By this means, in a situation such as when reminding a user of a history of locations at which the user stopped on a non-daily or occasional basis, the usefulness of the image library for the user can be improved.

Other Embodiments of Present Invention

In a case where a destination location is set at the client 2, route guidance as far as the relevant destination location may be executed by the information processing server 1. Specifically, in a case where the second server arithmetic processing element 12 receives a destination location from the client 2, the second server arithmetic processing element 12 searches for one or a plurality of server routes R(1) which are constituted by a plurality of link groups that link the present location or departure location of the client 2 and the relevant destination location. When searching for the server route R(1), the server map information and travelling cost with respect to each link are used. A route on which the total travelling cost is lowest is retrieved as the server route R(1).

The second server arithmetic processing element 12 generates server route information that represents the server route R(1), and then transmits the server route information to the client 2. The "server route information" includes link identification information for at least some links among a series of link groups constituting the server route R(1), or coordinate values for each of a discrete plurality of locations that are on the server route R(1).

The second client arithmetic processing element 22 in the client 2 receives the server route information. Based on the server route information, the second client arithmetic processing element 22 uses the client map information to calculate a client route R(1) that links the departure location or present location and the destination location, and then outputs the client route R(1) to the output device 232.

For example, the client route R(1) is searched for so as to include a plurality of locations represented by coordinate values or a link identified by link identification information included in the server route information (so that at least some of the server route R(1) is reproduced). By this means, the client route R(1) is superimposed on a client map, and is displayed on the display constituting the output device 232.

REFERENCE SIGNS LIST

1 . . . Information Processing Server, 10 . . . Server Storage Device, 11 . . . First Server Arithmetic Processing Element, 12 . . . Second Server Arithmetic Processing Element, 2 . . . Client, 21 . . . First Client Arithmetic Processing Element, 22 . . . Second Client Arithmetic Processing Element, V . . . Movable Body

What is claimed is:

1. A client that is mounted in a movable body, and comprises an imaging device, a client storage device configured to associate an image that is imaged by the imaging device with a location where the image is imaged and to store and hold the associated image and the location where the image is imaged, an input device and an output device, and has a function that communicates with an information processing server, the client further comprising:

a first client arithmetic processing element configured to register an image that is imaged by the imaging device in the client storage device in response to a start of an "off" period of the movable body, and in response to a start of an "on" period of the movable body that follows registration of the image, to associate and transmit the image and a designated location as a location where the image is imaged or a location where the client is present at an ending time point of a previous "on" period or a starting time point of a current "on" period of the movable body to the information processing server, and to cause the image that corresponds to a first designated location that is outside a base area that is specific to the client among the designated locations to be registered as a first image in the information processing server; and a second client arithmetic processing element configured to cause an image library relating to a movement route of the client with respect to a trip period of the client that is generated based on a plurality of the first images that are registered in the information processing server in response to a start of an "off" period of the movable body that occurs one or a plurality of times during the trip period to be output by the output device after being recognized by means of communication with the information processing server, wherein the base area is an area including a location for which a stopping frequency of the movable body is equal to or greater than a first threshold value determined by the information processing server based on an on/off period of the movable body.

2. The client according to claim 1, wherein:
the first client arithmetic processing element transmits a chronological order of positions of the client to the information processing server; and
the second client arithmetic processing element causes the image library that is associated with a movement route during the trip period which is defined based on the chronological order of positions of the client to be output by the output device after being recognized by means of communication with the information processing server.

3. The client according to claim 1, wherein:
the first client arithmetic processing element causes at least one of a location and an image that are designated through the input device to be registered in the information processing server as at least one of a second designated location and a second image; and
the second client arithmetic processing element causes the image library that is generated based on the second image that corresponds to the second designated location that is within a reference distance from the first designated location that is included in the movement route to be output by the output device after being recognized by means of communication with the information processing server.

* * * * *